US006040547A

United States Patent [19]

Antonova et al.

[11] Patent Number: 6,040,547

[45] Date of Patent: Mar. 21, 2000

[54] GAS DISCHARGE DEVICE

[75] Inventors: Tatijana Borisovna Antonova; Gleb Elmirovich Bougrov, both of Moscow, Russian Federation; Sergey Gennadievich Kondranin; Elena Alexandrovna Kralkina, both of Seoul, Rep. of Korea; Vladimir Borisovich Pavlov, Moscow, Russian Federation; Andrej Fedorovich Alexandrov, Moscow, Russian Federation; Anri Amvrosievich Rukhadze, Moscow, Russian Federation

[73] Assignee: Plasma Tech Co., Ltd., Rep. of Korea

[21] Appl. No.: 09/101,922

[22] PCT Filed: Nov. 18, 1997

[86] PCT No.: PCT/KR97/00225

§ 371 Date: Jun. 7, 1999

§ 102(e) Date: Jun. 7, 1999

[87] PCT Pub. No.: WO98/22969

PCT Pub. Date: May 28, 1998

[30] Foreign Application Priority Data

Nov. 18, 1996 [RU] Russian Federation ............ 96122058

[51] Int. Cl.[7] ............................................ B23K 10/00

[52] U.S. Cl. ............................ 219/121.43; 219/121.4; 219/121.52; 219/121.48; 204/298.17; 204/298.37; 118/723 AN; 315/111.21

[58] Field of Search ......................... 219/121.4, 121.41, 219/121.43, 121.52, 121.48, 121.36, 123; 204/298.17, 298.37, 298.38; 118/723 I, 723 AN; 156/646.1, 345; 315/111.21

[56] References Cited

U.S. PATENT DOCUMENTS

| | | | |
|---|---|---|---|
| 5,279,669 | 1/1994 | Lee | 118/723 MR |
| 5,429,070 | 7/1995 | Campbell et al. | 118/723 R |

FOREIGN PATENT DOCUMENTS

| | | |
|---|---|---|
| 0474584 | 3/1992 | European Pat. Off. . |
| 2235086 | 2/1991 | United Kingdom . |

OTHER PUBLICATIONS

Patent Abstracts of Japan, vol. 18, No. 252 (E–1547), 1994, JP 6–36695 A (Nissin Electric).

*Primary Examiner*—Mark Paschall
*Attorney, Agent, or Firm*—Ostrolenk, Faber, Gerb & Soffen, LLP

[57] ABSTRACT

The invention relates to a plasma technique, and can be used for generation of beams of charged particles, for instance, ions, in technological goals and in the space electric propulsion installations. Gas discharge device comprises an axially symmetric chamber with at least one face wall, a HF power input unit and a magnetic system providing the generation of stationary non-uniform magnetic field inside the chamber. The induction of magnetic field decreases not only in the radial direction towards the chamber axis of symmetry but also in the longitudinal direction towards the face part of the chamber opposite to the area of HF power input unit arrangement. The invention is characterized in that the HF power input unit is fabricated as conductor of zigzag recurrent symmetric shape and is located on the lateral and face walls of the chamber comprising the region of plasma generation and in that the horizontal size of the chamber exceeds its longitudinal size.

8 Claims, 2 Drawing Sheets

GAS DISCHARGE DEVICE

TECHNICAL FIELD

The invention relates to a plasma technique, and can be used for generation of the charged particles flows, for instance, ions, in ground technologies and in ion engines of space installations.

BACKGROUND ART

The known gas discharge device (GB, A, 1399603, HO1J27/00, 1072) consists of an axially symmetric chamber with two face walls, one of which is fabricated partially transparent, a magnetic system producing inside the chamber a stationary non-uniform magnetic field and a HF power input unit connected to the HF generator. The HF power input unit is formed by at least two conductors of current.

Plasma generation in the known device is conducted by excitation in plasma waves in itself. In this case the effective HF power input in plasma is provided and satisfactory values of ionization coefficient are achieved at sufficiently low specific energy expenditures for ionization.

Resonance absorption of the input power occurs at the gas pressures (0.015–1.5 Pa) and values of magnetic field induction B less than 0.1 T1. However, under said conditions the plasma density increases considerably due to the decrease of the gas of the gas discharge device.

It is also known the gas discharge device (RU, application 95110327/07, published 10.08.96) which consists of a magnetic system producing in the discharge chamber a stationary axially-symmetric non-uniform magnetic field of which a magnetic induction decreases to the chamber axis of symmetry. The HF power input unit is formed by several conductors of current, for instance in the form of n-pole capacitor and is adapted for excitation of longitudinal irrotational electrical component of HF field in the chamber.

This construction gives an opportunity to excite plasma waves in itself by choosing the maximum value of magnetic field induction in the range from 0.01 to 0.05 Tl and HF in the range from 40 to 100 MHZ. Resonance excitation of plasma waves in itself under said conditions gives an opportunity to increase an energy and gas efficiency of the gas discharge device.

The closest prototype of the invention is gas discharge device (GB, A, 2235086, HO1J 27/16,1991), consisting of a cylindrical chamber with one open face wall, a HF power supply unit formed with several conductors of current, which is located symmetrically on the lateral surface of the chamber, and a magnetic system providing in the chamber the stationary magnetic field of which the magnetic induction decreases not only in the radial direction towards the chamber axis of symmetry but also in the longitudinal direction from the position of power input unit.

The known gas discharge device gives an opportunity to increase the efficiency of the power input due to the choice of the optimal magnetic field configuration a nd the construction of the power input unit.

However all above mentioned devices do not provide the full utilization (for ionization of the working body) of the input power.

DISCLOSURE OF THE INVENTION

The present invention is aimed to provide an increase of energy and gas efficiency of gas discharge devices of the described type and thus decreases expenditures for generating plasma with the given parameters.

The noticeable technical result is as follows: Gas discharge device comprising an axially symmetric chamber at least having one face wall, an HF power input unit for inputting the HF power to the chamber, coaxially arranged on the exteral wall of the chamber, and a magnetic system for providing a stationary magnetic field of which the magnetic induction decreases not only in the radial direction towards the chamber axis of symmetry but also in the longitudinal direction from the area in which the HF power input unit is located inside the chamber, characterized in that the HF power input unit is fabricated as an conductor of zigzag recurrent symmetric shape arranged on the face wall and lateral wall of the chamber, and in that the magnetic system is adjusted to generate the magnetic field of which the magnetic induction decreases in the longitudinal direction towards the face part of the chamber opposite to the area where the HF power input unit is arranged.

In order to increase gas efficiency of the device it is worth to use the chamber of which a horizontal dimension is larger than longitudinal.

It is worth to provide the chamber with gas distributor arranged on its face surface from the side of the HF power input unit arrangement.

Gas discharge device can be accommodated by the assembling flange where the chamber is fixed. In this case air-tight gaskets for electrical terminals of the HF power input unit and for a gas distributor, and also-an elements of plug connection for fixing an assembling flange to an adjusting flange of the vacuum chamber are mounted on the assembling flange.

It is advisable to fabricate air-tight gaskets as two bolsters with obturator collar between the bolsters, and obturator blot, arranged coaxially with one of the bolsters.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

MODES FOR CARRYING OUT THE PREFERRED EMBODIMENTS

Figure 1:
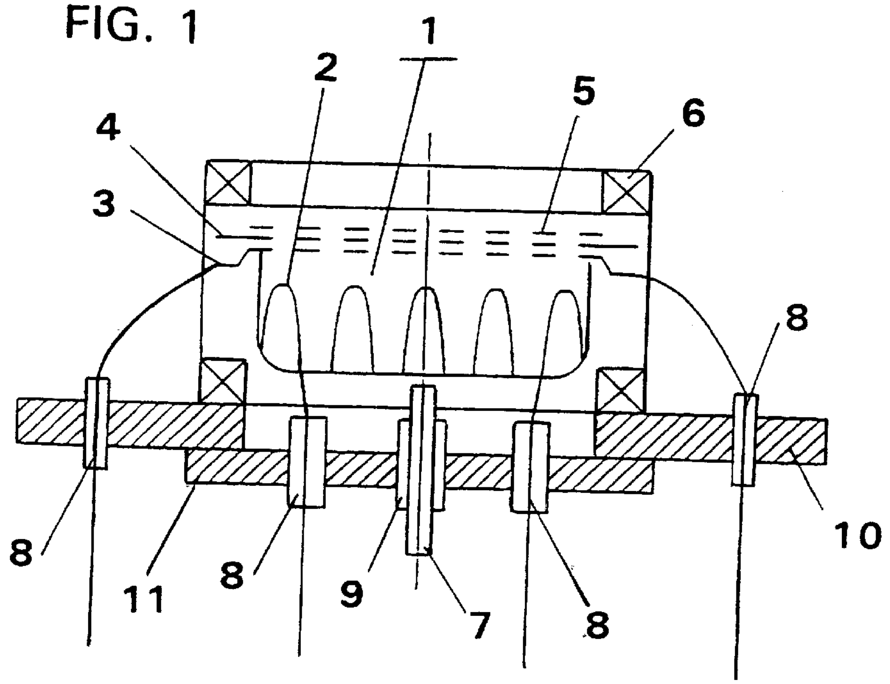
FIG. 1 illustrates a construction of the gas discharge device according to the invention to show schematically an ion-optic system, a magnetic system and a flange.

The gas discharge device according to the invention can be used as a component of different technological installations with some modifications, for example, as a component of plasma chemical reactors and ion beam installations as well as a part of electric propulsion systems.

The gas discharge device according to the invention which is realized as a part of ion beam installation will be described in the following with reference to the accompanying drawing. The installation (see FIG. 1) comprises a chamber 1 as an axially symmetric bulb, a HF antenna 2, to be the HF power input unit, an ion optic system, consisting of two electromagnetic reels 6, gas inlet 7, air-tight gaskets 8 of electrical terminals of HF antenna 2 and electrodes 3, 4 and 5, an air-tight gasket 9 of gas inlet 7, assembling flange 10 and adjusting flange 11.

Figure 2:
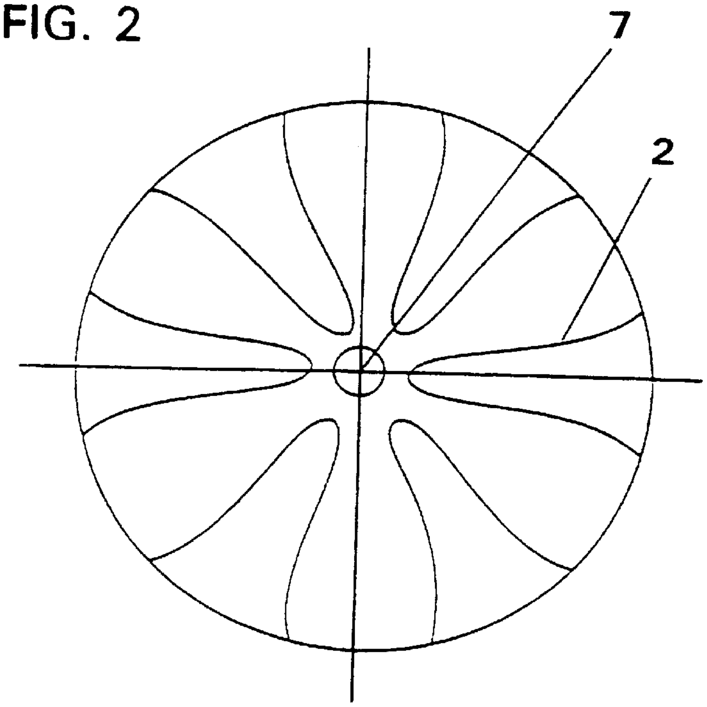
FIG. 2 shows a shape of an antenna for discharge which is arranged inside the chamber according to FIG. 1.

Antenna 2 to be the HF power input unit is fabricated as a conductor of zigzag, recurrent symmetric shape one part of which is located on the lateral wall of the chamber (see FIG. 1) and the other part of which is located on the face wall of the chamber 1 (see FIG. 2).

The output face part of the chamber 1 is located in the area of decreasing magnetic field produced with the help of electromagnetic reels 6 (see FIG. 1).

The walls of the chamber 1 are fabricated from dielectric material but it is worth to mention that dielectric material can be used for manufacturing only the part of the walls of the chamber 1 situated in the area of the HF antenna 2 location.

The size of the chamber 1 along its longitudinal axis of symmetry is equal to the radius of the internal cylindrical surface of its lateral wall.

Figure 3:
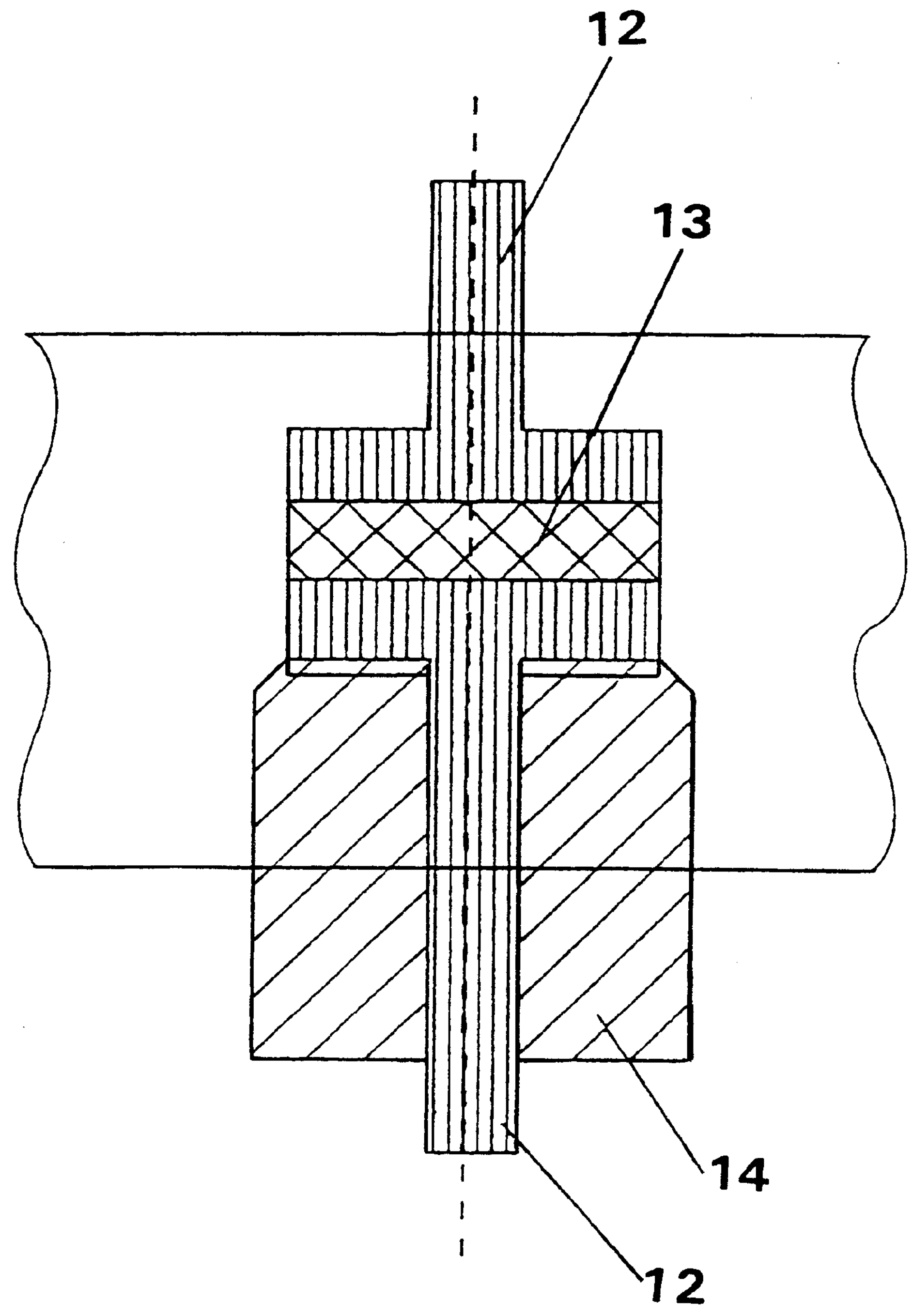
FIG. 3 shows a supporting part of the gas discharge device according to the invention.

Each air-tight gasket 8 or 9 (see FIG. 3) contains two bolsters 12 made from fluoride layer with obturator collar between them, made from rubber. The air tight gaskets are crunched by special crunching bolts 14, adjusted thruthly with bolsters 12.

The operation of the installation is conducted in the following way.

The working gas-argon is supplied to the chamber 1 through the gas inlet 7. In the chamber 1 with the help of electromagnetic reels 6 it is provided the axially symmetric non-uniform magnetic field which induction decreases in the radial direction towards the chamber axis of symmetry and in the longitudinal direction from the area where the HF power input unit is located towards the opposite face part of the chamber 1 where the ion optic system is located.

The given distribution of magnetic field in the chamber 1 can be provided with the help of different facilities, known to specialists in this field of techniques.

After supplying of argon to the chamber 1 is accomplished with the help of antenna 2, fabricated as a conductor of zigzag shape comprising face and lateral walls of the chamber in the region of the presence of the magnetic field of the given configuration.

Under the action of the electrical component of the HF field in the discharge volume of the chamber the HF discharge is ignited and plasma is formed.

The increase of the efficiency of the HF power input and consequently the increase of the charged particles density and plasma temperature in the said device is provide is provided by localization of the magnetic field in the area of HF fields generation produced by the antenna 2 of the special configuration.

It was found experimentally that the increase of the energy and gas efficiency of the ions generation in the chamber 1 and ion source as a whole in comparison with the closest prototypes can be achieved only in the case of HF power input unit fabrication in the form of conductor of zigzag recurrent symmetric shape comprising the face wall of the chamber 1 in the area of the maximal induction of magnetic field decreasing towards the chamber axis of symmetry.

In case of utilization argon as working gas the frequency of the generated HF field is chosen in the range from 10 to 100 MHZ, maximal value of stationary magnetic filed is chosen in the range from 0.01 to 0.1 T1, and, the value of the input HF-in the range from 20 to 200 W in dependence on required plasma density and density of extracted ion current.

Extraction and forming of the ion beam in the considered modification of the ion source is carried out with the help of ion extraction system, consisting of three electrodes and realizing the principle "acceleration deceleration".

Between the generated gas discharge plasma of which the potential is et by the emission electrode 3 and accelerating electrode 4 and grounded electrode 5 the electrical field is created to extract ions and form ion beam with a given ion current density (0.2–2 mA/cm$^2$).

In order to provide the possibility of getting out the gas discharge device from the vacuum chamber independently from the other elements of the ion source construction, the chamber 1 is fixed on the demountable assembling flange 11. Magnetic system and ion-optic system are mounted on the adjusting flange 10 of the vacuum chamber.

The demountable air-tight gaskets 8 of electrical terminals of power input unit and the air-tight gasket of the gas inlet are mounted on the assembling flange.

Demounting of the chamber 1, for example while conducting technological work, is carried out by resolution of the assembling flange 11 from the adjusting flange 10 of the vacuum chamber with the help of plug connection (not shown of the Figure).

Resolution of the chamber 1 from the assembling flange 11 is conducted after demounting of the demountable air-tight gaskets 8 and 9. To do it the crunching bolts 14 is unscrewed from the aperture in the flange 11, the external fluoride layered bolster 14 is taken out, rubber collar 13 and internal fluoride layered bolster 12 are taken out coherently. After demounting of all air-tight gaskets, the assembling flange 11 is set free from electrical terminals of HF antenna 2 and from gas inlet 7.

The above described arrangement of the antenna 2 (HF power input unit into the chamber 1) on the chamber 1 and the utilization of magnetic system adjusted for generation of the stationary non-uniform magnetic field with given gradient in the place of the antenna 2 give an opportunity to provide effective HF power into generated magnitoactive plasma which can be characterized by the value of the specific power expenditures for the generation of the ion beam with the current of 1 Amp.

For the considered modification of the realization of the being patented invention as a component of the ion source the achieved value of specific energy expenditures does not exceed 450 W/A at the extracted ion beam current density ranging from 0.2 to 2 mA/cm$^2$.

Thus, the gas discharge device being patented gives the opportunity to increase the efficiency of plasma generation which is characterized for this kind of devices by energy and gas efficiency in the given range of operation parameters.

INDUSTRIAL APPLICATION

In accordance with the invention the gas discharge device can be used in technological ion-beam installations assigned for manufacturing microelectronic and optical devices, in plasma-chemical reactors and in space technique as a component of electric propulsion.

In spite of the fact that the invention is described in relation to the preferred way of realization it is clear for specialists in this field of technique that changes and other kinds of utilization can take place without deviation from the general idea and the subject of invention. These changes and modifications are considered not to go out from the frames of the rights asserted by the applied claims.

We claim:

1. Gas discharge device comprising an axially symmetric chamber at least having one face wall, an HF power input unit for inputting the HF power to the chamber, coaxially arranged on the external wall of the chamber, and a magnetic system for providing a stationary magnetic field of which the magnetic induction decreases not only in the radial direction towards the chamber axis of symmetry but also in the longitudinal direction from the area in which the HF power input unit is located inside the chamber, characterized in that the HF power input unit is fabricated as an conductor of zigzag recurrent symmetric shape arranged on the face wall and lateral wall of the chamber, and in that the magnetic system is adjusted to generate the magnetic field of which the magnetic induction decreases in the longitudinal direction towards the face part of the chamber opposite to the area where the HF power input unit is arranged.

2. Gas discharge device according to claim 1, characterized in that the horizontal size of the chamber exceeds its longitudinal size.

3. Gas discharge device according to claim 1 characterized in that the chamber is provided with the gas inlet assembled on the face wall of the chamber at the side of the HF power input unit arrangement.

4. Gas discharge device according to claim 1 characterized in that it is provided with an assembling flange where the chamber is fixed, and where airtight gaskets for electrical terminals of the HF power input unit and for a gas inlet, and also the elements of the plug connection for assembling the adjusting flange therewith are located.

5. Gas discharge device according to claim 4 characterized in that the air-tight gaskets consist of two bolsters, obturator collar which is assembled between the faces of the bolsters, and an obturator bolt which is arranged coaxially with one of the bolsters.

6. Gas discharge device according to claim 2 characterized in that the chamber is provided with the gas inlet assembled on the face wall of the chamber at the side of the HF power input unit arrangement.

7. Gas discharge device according to claim 2 characterized in that it is provided with an assembling flange where the chamber is fixed, and where air tight gaskets for electrical terminals of the HF power input unit and for a gas inlet, and also the elements of the plug connection for assembling the adjusting flange therewith are located.

8. Gas discharge device according to claim 3 characterized in that it is provided with an assembling flange where the chamber is fixed, and where air tight gaskets for electrical terminals of the HF power input unit and for a gas inlet, and also the elements of the plug connection for assembling the adjusting flange therewith are located.

* * * * *